H. P. PRICE.
BICYCLE SUPPORT.
APPLICATION FILED JULY 20, 1909.

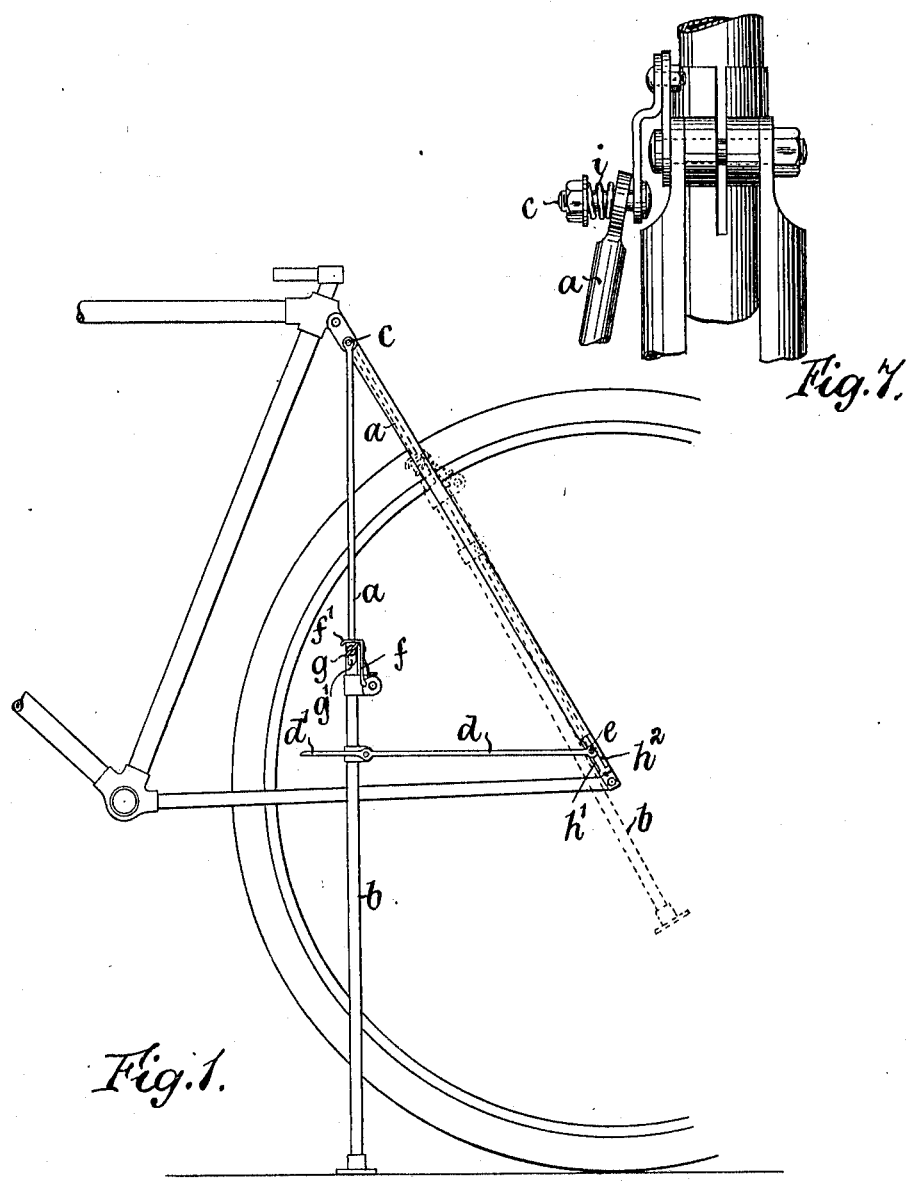

945,284.

Patented Jan. 4, 1910.
2 SHEETS—SHEET 2.

WITNESSES

INVENTOR

Hamelin Price Price
BY Wm Wallace White
ATTY.

UNITED STATES PATENT OFFICE.

HAMELIN PRICE PRICE, OF MAESTEG, ENGLAND.

BICYCLE-SUPPORT.

945,284.  Specification of Letters Patent.  Patented Jan. 4, 1910.

Application filed July 20, 1909. Serial No. 508,588.

*To all whom it may concern:*

Be it known that I, HAMELIN PRICE PRICE, subject of the King of Great Britain, residing at Brynheulog, Neath Road, Maesteg, in the county of Glamorgan, England, have invented new and useful Improvements in Bicycle-Supports, of which the following is a specification.

This invention relates to a contrivance for supporting a bicycle in an approximately upright position when at rest.

The contrivance comprises a telescopic prop pivoted to the bicycle and adapted to be extended so that the lower extremity of the prop is lowered into contact with the ground, in which condition the elements comprising the prop are rigidly united so as to afford the desired support to the bicycle.

A stay is provided for suitably directing the prop, such stay, in the retracted or raised position of the prop, coöperating automatically with a device for retaining the prop in the raised position.

The invention is illustrated on the accompanying drawing, in which:—

Figure 3:
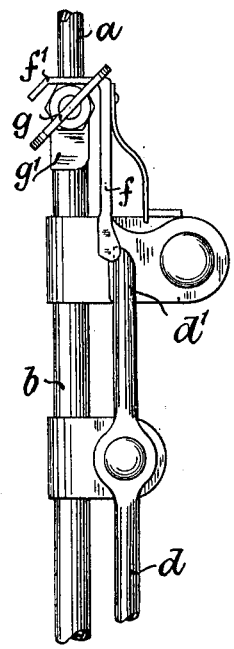
Figure 2:
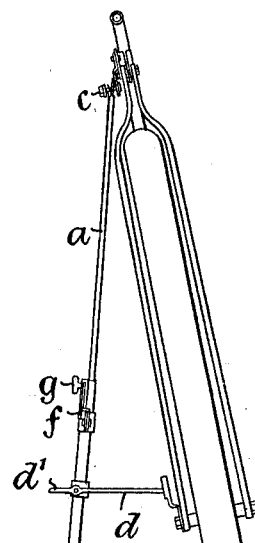
Figure 5:
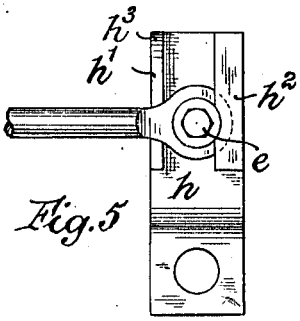
Figure 6:
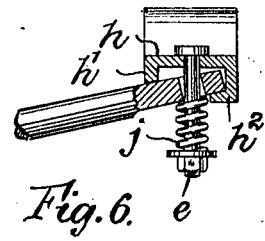
Figure 4:
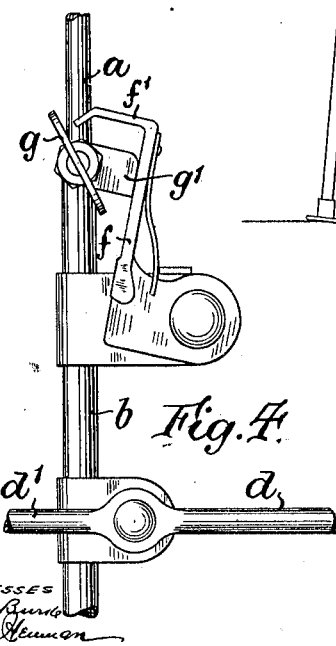

Figure 1 is a side elevation showing in full lines the support applied to a bicycle in the operative position and in dotted lines showing the support in the raised position. Fig. 2 is a rear elevation corresponding to the full lines of Fig. 1. On a larger scale:—Figs. 3 and 4 are side elevations of the upper end of the sliding member of the prop in the raised and lowered positions respectively. Figs. 5 and 6 are side elevation and sectional plan respectively of the pivotal connection of the stay with the bicycle, and:—Fig. 7 is a rear elevation of the pivotal connection of the prop therewith.

The bicycle support comprises two members $a$ $b$ of a telescopically extensible prop, pivoted at $c$ adjacent to the seat pillar of the bicycle.

$d$ is a stay which is pivoted at $e$ adjacent to the axis of the rear wheel and is pivotally connected to the sliding member $b$ of the prop at a slight distance from the extremity $d^1$ of the stay. The sliding member $b$ of the prop and the stay $d$ are adapted to be held in the raised position by a spring-influenced catch-lever $f$ mounted at the upper extremity of the sliding member $b$, which catch-lever $f$ is adapted to engage the extremity $d^1$ of the stay $d$. The catch-lever $f$ is disengaged from the extremity $d^1$ by means of a lug $g^1$ provided on a set-screw $g$ which serves to clamp together the two members $a$ $b$ of the prop, as shown in Figs. 3 and 4 on the set-screw $g$ being angularly displaced in the direction appropriate to unclamp the two members $a$ and $b$. To prevent the set-screw $g$ from being unscrewed to an unnecessary degree a stop-plate $f^1$ is provided on the catch-lever $f$, with which stop-plate $f^1$ the lug $g^1$ will come into contact on exceeding the angular displacement necessary to effect the release of the stay from the catch-lever.

To effect an automatic outward displacement of the prop on being lowered and a relatively rigid connection of the stay with the bicycle when in the operative position, a bracket $h$, on which the stay $d$ is loosely pivoted on a bolt $e$, is provided with a pair of flanges $h^1$ $h^2$. The flange $h^1$, nearer to the members $a$ $b$, is provided with a beveled or rounded end $h^3$ adapted to displace the stay $d$ outward on the latter being turned downward, thus effecting the automatic outward displacement of the prop. The other flange $h^2$ is provided with an overhanging portion thus forming a groove in which the pivot end of the stay $d$ is engaged and, in conjunction with the flange $h^1$, more or less rigidly held when the prop and stay are in the operative position.

Springs $i$ and $j$ are provided on the pivots $c$ and $e$ respectively for the purpose of preventing rattling, the springs yielding to permit the outward displacement of the contrivance. The spring $j$ further serves to maintain the stay $d$ against the flange $h^1$ of the bracket $h$.

I claim:

1. A bicycle support comprising a telescopically extensible prop pivoted to the bicycle adjacent to the seat pillar thereof, a stay pivoted adjacent to the axis of the rear wheel and pivotally connected to the sliding member of the prop, means for rigidly clamping the telescoping members of the prop together and means on the prop for engaging the stay and retaining the prop in the raised position.

2. A bicycle support comprising a telescopically extensible prop pivoted to the bicycle adjacent to the seat pillar thereof, a stay pivoted adjacent to the axis of the rear wheel and pivotally connected to the sliding member of the prop, a set-screw for clamping the prop and a catch-lever mounted at the upper extremity of the sliding member for engaging the stay and retaining the prop in the raised position.

3. A bicycle support comprising a telescopically extensible prop pivoted to the bicycle adjacent to the seat pillar thereof, a stay pivoted adjacent to the axis of the rear wheel and at a slight distance from its extremity pivotally connected to the sliding member of the prop, a set-screw for clamping the prop and a catch-lever mounted at the upper extremity of the sliding member for engaging the extremity of the stay and retaining the prop in the raised position.

4. A bicycle support comprising a telescopically extensible prop pivoted to the bicycle adjacent to the seat pillar thereof, a stay pivoted adjacent to the axis of the rear wheel and at a slight distance from its extremity pivotally connected to the sliding member of the prop, a catch lever mounted at the upper extremity of the sliding member for engaging the extremity of the stay and retaining the prop in raised position, a set-screw for clamping the prop, and a lug on said set-screw adapted to disengage the catch-lever from the stay.

5. A bicycle support comprising a telescopically extensible prop pivoted to the bicycle adjacent to the seat pillar thereof, a stay pivoted adjacent to the axis of the rear wheel and at a slight distance from its extremity pivotally connected to the sliding member of the prop, a set-screw for clamping the prop, a catch lever mounted at the upper extremity of the sliding member for engaging the extremity of the stay and retaining the prop in the raised position, a lug on said set-screw adapted to disengage the catch-lever from the stay, and a stop-plate provided on the catch-lever.

6. A bicycle support comprising a telescopically extensible prop pivoted to the bicycle adjacent to the seat pillar thereof, a stay pivoted adjacent to the axis of the rear wheel and pivotally connected to the sliding member of the prop, and means for outwardly displacing and rigidly connecting the stay with the bicycle on the prop being lowered.

7. A bicycle support comprising a telescopically extensible prop pivoted to the bicycle adjacent to the seat pillar thereof, a bracket mounted adjacent to the rear wheel and having an outwardly directed flange $h^1$ with the rounded end $h^3$ and an overhanging flange $h^2$ and a stay loosely pivoted on said bracket and pivotally connected with the sliding member of the prop.

8. A bicycle support comprising a telescopically extensible prop pivoted to the bicycle adjacent to the seat pillar thereof, a stay pivoted adjacent to the axis of the rear wheel and pivotally connected to the sliding member of the prop, means for outwardly displacing and rigidly connecting the prop with the bicycle on the prop being lowered, means for rigidly clamping the prop and means for engaging the stay and retaining the prop in the raised position.

In testimony whereof I have signed my name to this specification in the presence of two subscribing witnesses.

HAMELIN PRICE PRICE.

Witnesses:
S. W. ALLEN,
ALBERT S. PHILLIPS.